(12) United States Patent
Yun et al.

(10) Patent No.: US 12,545,249 B2
(45) Date of Patent: Feb. 10, 2026

(54) SENSOR INFORMATION FUSION METHOD AND DEVICE, AND RECORDING MEDIUM RECORDING PROGRAM FOR EXECUTING THE METHOD

(71) Applicants: Hyundai Motor Company, Seoul (KR); Kia Corporation, Seoul (KR)

(72) Inventors: Bo Young Yun, Gyeonggi-do (KR); Su Min Jo, Gyeonggi-do (KR); Nam Hyung Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 593 days.

(21) Appl. No.: 17/897,764

(22) Filed: Aug. 29, 2022

(65) Prior Publication Data

US 2023/0090259 A1     Mar. 23, 2023

(30) Foreign Application Priority Data

Sep. 23, 2021   (KR) .......................... 10-2021-0125724

(51) Int. Cl.
*B60W 30/095*     (2012.01)
*B60W 50/00*      (2006.01)

(52) U.S. Cl.
CPC .......... *B60W 30/095* (2013.01); *B60W 50/00* (2013.01); *B60W 2050/0022* (2013.01); *B60W 2556/35* (2020.02)

(58) Field of Classification Search
None
See application file for complete search history.

(56) References Cited

U.S. PATENT DOCUMENTS

| | | | |
|---|---|---|---|
| 10,565,468 B2 | 2/2020 | Schiffmann | |
| 12,077,178 B2* | 9/2024 | Aoki | B60W 40/09 |
| 12,179,751 B2* | 12/2024 | Kamann | B60W 40/13 |
| 2011/0025548 A1* | 2/2011 | Nickolaou | G01S 13/72 |
| | | | 342/52 |
| 2012/0221273 A1* | 8/2012 | Furukawa | G01S 13/86 |
| | | | 702/94 |
| 2017/0297571 A1* | 10/2017 | Sorstedt | G01S 7/295 |
| 2019/0324129 A1 | 10/2019 | Castorena Martinez et al. | |
| 2020/0025873 A1 | 1/2020 | Kubertschak et al. | |
| 2021/0056713 A1* | 2/2021 | Rangesh | G01S 17/89 |
| 2022/0212660 A1* | 7/2022 | Freeman | G01S 7/417 |
| 2023/0034560 A1* | 2/2023 | Kamann | G01S 13/589 |
| 2023/0061682 A1* | 3/2023 | Gade | B60W 50/0098 |

(Continued)

FOREIGN PATENT DOCUMENTS

| | | |
|---|---|---|
| JP | 5689907 B2 | 3/2015 |
| KR | 10-2020-0024927 A | 3/2020 |
| KR | 10-2020-0070854 A | 6/2020 |

*Primary Examiner* — Peter D Nolan
*Assistant Examiner* — Jacob Kent Besteman-Street
(74) *Attorney, Agent, or Firm* — Fox Rothschild LLP (57) ABSTRACT

A sensor information fusion method of an embodiment includes selecting target tracks having distances from a reference track within a predetermined distance from among tracks obtained by a plurality of sensors, and selecting a target fusion track to be fused with the reference track on the basis of sums of first calculation values calculated according to distances between the selected target tracks and the reference track and second calculation values calculated according to overlapping areas of the target tracks and the reference track.

19 Claims, 8 Drawing Sheets

(56) References Cited

U.S. PATENT DOCUMENTS

| | | | |
|---|---|---|---|
| 2023/0090259 A1* | 3/2023 | Yun | B60W 30/095 701/26 |
| 2023/0258797 A1* | 8/2023 | Jang | G01S 17/42 342/70 |
| 2024/0075922 A1* | 3/2024 | Lee | B60W 30/095 |
| 2024/0400088 A1* | 12/2024 | Hanasoge Shankaranarayana Rao | G06V 10/764 |

* cited by examiner

SENSOR INFORMATION FUSION METHOD AND DEVICE, AND RECORDING MEDIUM RECORDING PROGRAM FOR EXECUTING THE METHOD

CROSS-REFERENCE TO RELATED APPLICATIONS

The present application claims under 35 U.S.C. § 119(a) the benefit of Korean Patent Application No. 10-2021-0125724, filed on Sep. 23, 2021, which is hereby incorporated by reference as if fully set forth herein.

BACKGROUND

Technical Field

Embodiments relate to a sensor information fusion method and device, and a recording medium recording a program for executing the method.

Discussion of the Related Art

The core of technical development of autonomous vehicle driving and advanced driver assistance systems (ADAS) technology is technology for obtaining accurate and reliable information about surrounding environments. Various methods are used to obtain highly reliable surrounding environment information. Thereamong, technology for fusing sensor information between different types of sensors is used.

The sensor information fusion technology fuses information sensed by a plurality of sensors installed in a vehicle, for example, a camera, a radar (Radio Detection and Ranging) device, and a LiDAR (Light Detection and Ranging) device to recognize a situation around a host vehicle.

The sensor information fusion technology can guarantee reliability when sensing vehicles traveling at constant speeds having a sufficient distance therebetween on a simple road, but in actual driving, various situations such as low-speed merging vehicles, and turning or U-turning vehicles may occur. Accordingly, there is a demand for sensor information fusion technology capable of guaranteeing reliability and accuracy in various situations.

SUMMARY

Embodiments provide a sensor information fusion method and device which may accurately and reliably fuse information sensed by a plurality of sensors, and a recording medium recording a program for executing the method.

Embodiments provide a sensor information fusion method and device which may guarantee reliability and accuracy even in various situations such as a low-speed merging vehicle, and a turning or U-turning vehicle, and a recording medium recording a program for executing the method.

It will be appreciated by persons skilled in the art that the objects that could be achieved with the present disclosure are not limited to what has been particularly described hereinabove and the above and other objects that the present disclosure could achieve will be more clearly understood from the following detailed description.

To achieve these objects and other advantages and in accordance with the described purpose, as embodied and broadly described herein, a sensor information fusion method may include selecting target tracks having distances from a reference track within a predetermined distance from among tracks obtained by a plurality of sensors, and selecting a target fusion track to be fused with the reference track on the basis of sums of first calculation values calculated according to distances between the selected target tracks and the reference track and second calculation values calculated according to overlapping areas of the target tracks and the reference track.

For example, the selecting of target tracks may include setting a gate on the basis of the reference track, and selecting, as the target tracks, tracks located inside the gate among the tracks obtained by the plurality of sensors.

For example, the first calculation values may be calculated according to distance between a midpoint of the reference track and midpoints of the target tracks.

For example, the selecting of a target fusion track to be fused with the reference track may include calculating the first calculation values as smaller values as the distances between the midpoint of the reference track and the midpoints of the target tracks become shorter, and selecting a target track having the smallest sum of the first calculation value and the second calculation value as a target fusion track to be fused with the reference track.

For example, the sensor information fusion method may further include calculating the first calculation value as a relatively large value when the size of the target track is smaller than the size of the reference track.

For example, the sensor information fusion method may further include calculating the first calculation value as a relatively large value when the reference track and the target track are arranged in a lateral direction.

For example, the selecting of a target fusion track to be fused with the reference track may include calculating the second calculation values as smaller values as the overlap ratios of the target tracks and the reference track increase, and selecting a target track having the smallest sum of the first calculation value and the second calculation value as a target fusion track to be fused with the reference track.

For example, the sensor information fusion method may further include calculating the second calculation value as a relatively small value when the size of the target track is greater than the size of the reference track.

For example, the sums of the first calculation values and the second calculation values may be calculated using the following combined cost calculation formula.

$$\text{Combined Cost} = W_{NN} * \frac{D_{NN}}{D_{max}} + W_{OL} * \left(1 - \frac{A_{OL}}{A_T}\right)$$

$W_{NN}$, $W_{OL}$: Weight values adjusted depending on a ratio of the areas between the reference track and a target track $D_{NN}$: Distance between midpoints of the reference track and the target track $D_{max}$: Distance between the midpoint of the reference track and one of two intersection points of the reference track located on a straight line connecting the midpoints of the reference track and the target track, which is closer to the midpoint of the target track $A_{OL}$: Overlapping area between the reference track and the target track $A_T$: Area of the target track For example, the sum of $W_{NN}$ and $W_{OL}$ may be 1, the weight of $W_{OL}$ may increase when the size of the target track is greater than the size of the reference track, and the weight of $W_{NN}$ may increase when the size of the target track is smaller than the size of the reference track.

For example, the sensor information fusion method may further include calculating $W_{NN}$ and $W_{OL}$ using the following formulas when the area $A_R$ of the reference track is greater than the area $A_T$ of the target track $(A_R > A_T)$.

$$W_{NN} = 1 - 0.5 * \frac{A_T}{A_R},$$

$$W_{OL} = 1 - W_{NN}$$

For example, the sensor information fusion method may further include calculating $W_{NN}$ and $W_{OL}$ using the following formulas when the area $A_R$ of the reference track is not greater than the area $A_T$ of the target track.

$$W_{OL} = 1 - 0.5 * \frac{A_R}{A_T},$$

$$W_{NN} = 1 - W_{OL}$$

In another embodiment of the present disclosure, a recording medium recording a program for executing a sensor information fusion method may be provided. The program may implement a function of selecting target tracks having distances from a reference track within a predetermined distance from among tracks obtained by a plurality of sensors, and selecting a target fusion track to be fused with the reference track on the basis of sums of first calculation values calculated according to distances between the selected target tracks and the reference track and second calculation values calculated according to overlapping areas of the target tracks and the reference track.

In another embodiment of the present disclosure, a sensor information fusion device may include a plurality of sensors configured to obtain sensor data regarding an object around a vehicle, and a controller configured to select target tracks having distances from a reference track within a predetermined distance from among tracks obtained by the plurality of sensors, and to select a target fusion track to be fused with the reference track on the basis of sums of first calculation values calculated according to distances between the selected target tracks and the reference track and second calculation values calculated according to overlapping areas of the target tracks and the reference track.

For example, the controller may set a gate on the basis of the reference track and select, as the target tracks, tracks located inside the gate from among the tracks obtained by the plurality of sensors.

For example, the controller may calculate the first calculation values as smaller values as the distances between the midpoint of the reference track and the midpoints of the target tracks are shorter and select a target track having the smallest sum of the first calculation value and the second calculation value as a target fusion track to be fused with the reference track.

For example, the controller may calculate the second calculation values as smaller values as the overlap ratios of the target tracks and the reference track increase and select a target track having the smallest sum of the first calculation value and the second calculation value as a target fusion track to be fused with the reference track.

For example, the controller may calculate the sums of the first calculation values and the second calculation values using the following combined cost calculation formula.

$$\text{Combined Cost} = W_{NN} * \frac{D_{NN}}{D_{max}} + W_{OL} * \left(1 - \frac{A_{OL}}{A_T}\right)$$

$W_{NN}$, $W_{OL}$: Weight values adjusted depending on a ratio of the areas between the reference track and a target track $D_{NN}$: Distance between midpoints of the reference track and the target track $D_{max}$: Distance between the midpoint of the reference track and one of two intersection points of the reference track located on a straight line connecting the midpoints of the reference track and the target track, which is closer to the midpoint of the target track $A_{OL}$: Overlapping area between the reference track and the target track $A_T$: Area of the target track For example, the controller may calculate $W_{NN}$ and $W_{OL}$ using the following formulas when the area $A_R$ of the reference track is greater than the area $A_T$ of the target track $(A_R > A_T)$, and $$W_{NN} = 1 - 0.5 * \frac{A_T}{A_R},$$

$$W_{OL} = 1 - W_{NN}$$

calculate $W_{NN}$ and $W_{OL}$ using the following formulas when the area $A_R$ of the reference track is not greater than the area $A_T$ of the target track.

$$W_{OL} = 1 - 0.5 * \frac{A_R}{A_T},$$

$$W_{NN} = 1 - W_{OL}$$

The sensor information fusion method and device, and the recording medium recording program for executing the method according to embodiments can associate results sensed for the same object by varying weights using information on a distance and an overlapping range between target track boxes, to improve sensor information fusion performance.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE DRAWINGS

FIG. 6 (a) illustrates a case where the area $A_T$ of the target track is less than the area $A_R$ of the reference track ($A_R > A_T$), and FIG. 6(b) illustrates a case where the area $A_T$ of the target track is larger than the area $A_R$ of the reference track ($A_R < A_T$).

FIG. 8(a) illustrates a case in which a lateral error occurs, FIG. 8(b) illustrates a case in which a longitudinal error occurs, and FIG. 8(c) illustrates a case in which longitudinal/lateral errors occur.

DETAILED DESCRIPTION

Hereinafter, some embodiments of the present disclosure will be described in detail with reference to the exemplary drawings. However, embodiments may be modified in various manners, and the scope of the present disclosure should not be construed as being limited to the exemplary embodiments described below. In the drawings, the same reference numerals will be used throughout to designate the same or equivalent elements. In addition, a detailed description of well-known features or functions may be omitted in order not to unnecessarily obscure the gist of the present disclosure but will be known to a person skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In the description of embodiments, when an element is described as being formed on "on" or "under" another element, "on" or "under" includes a case where both elements are in direct contact with each other or a case in which one or more other elements are indirectly disposed between the two elements.

In addition, in the case of representation of "on" or "under", it may include the meaning of the downward direction as well as the upward direction based on one element.

Further, relational terms such as "first", "second," "top"/"upper"/"above" and "bottom"/"lower"/"under" used below may be used to distinguish a certain entity or element from other entities or elements without requiring or implying any physical or logical relationship between entities or order thereof.

Hereinafter, a sensor information fusion method 100 according to an embodiment will be described with reference to the drawings. Although the sensor information fusion method 100 will be described using a Cartesian coordinate system (x-axis, y-axis, z-axis) for convenience, the sensor information fusion method can also be described using other coordinate systems.

Figure 1:
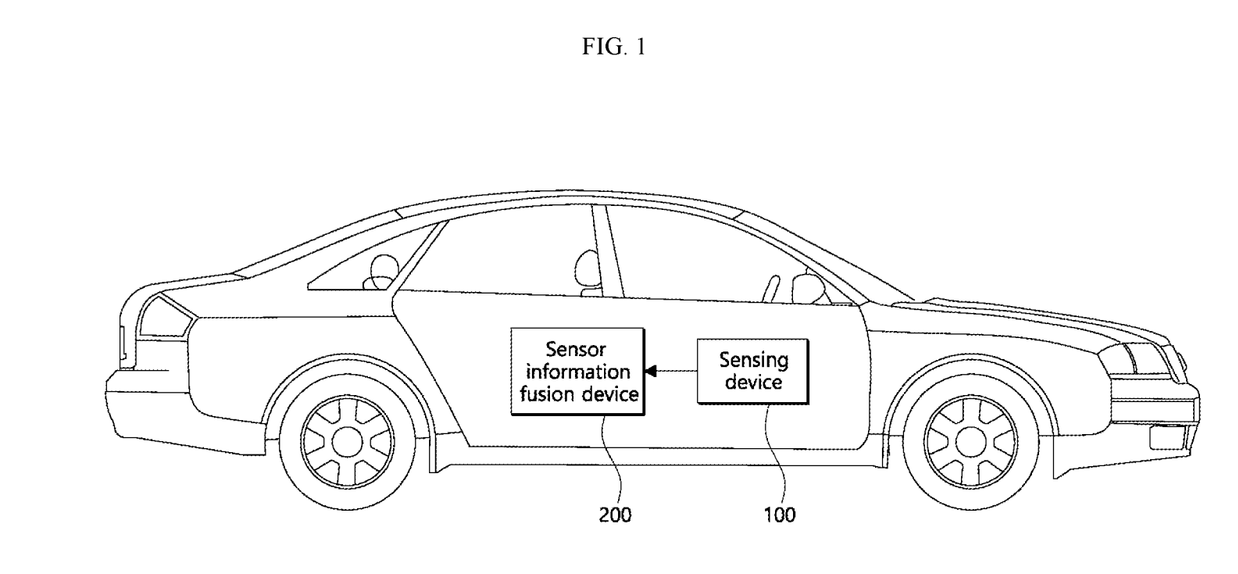
FIG. 1 is a block diagram of a vehicle including a sensor information fusion device according to an exemplary embodiment.

FIG. 1 is a diagram for describing a vehicle to which a sensor information fusion device 200 according to an embodiment is applied.

As shown in FIG. 1, the vehicle may include a sensing device 100 for detecting an object present outside the vehicle and the sensor information fusion device 200 for recognizing the object by fusing sensor information obtained from the sensing device 100.

The sensing device 100 may include one or more sensors for obtaining information on a target object located in the vicinity of the vehicle. The sensing device 100 may obtain at least one or more pieces of information such as a position, moving speed, moving direction, and type (e.g., vehicle, pedestrian, bicycle, motorcycle, etc.) of a target object according to sensor type. The sensing device 100 may include a variety of sensors such as an ultrasonic sensor, a radar device, a camera, a laser scanner, a lidar device, a near vehicle detection (NVD) device, etc.

The sensor information fusion device 200 may detect objects by processing detection points input from sensors of the sensing device 100 and predict track information on the basis of the detected objects. The sensor information fusion device 200 may check whether the objects are the same object by varying weights using distances and overlapping ranges between the predicted track information, and if they are the same object, fuse information of the sensors to generate and output fusion track information.

Figure 2:
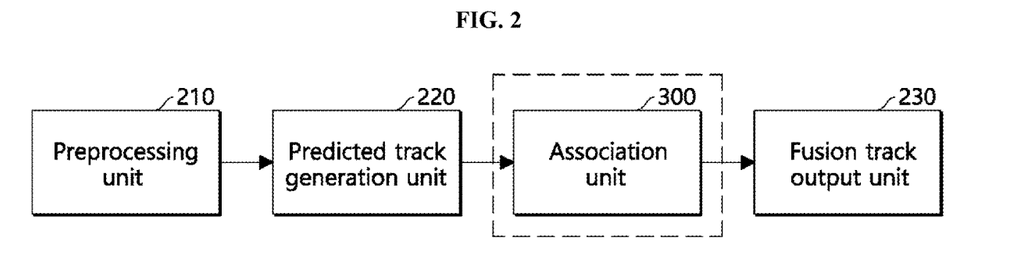
FIG. 2 is a schematic block diagram of the sensor information fusion device according to an exemplary embodiment.

FIG. 2 is a block diagram illustrating a schematic configuration of the sensor information fusion device 200 according to an embodiment.

Referring to FIG. 2, the sensor information fusion device 200 may include a preprocessing unit 210, a prediction track generation unit 220, an association unit 300, and a fusion track output unit 230.

The preprocessing unit 210 processes detection points input from each sensor into a form that can be fused. The preprocessing unit 210 may correct coordinates of sensing data obtained from each sensor to the same reference coordinates. In addition, the preprocessing unit 210 may remove a detection point having a data intensity or confidence that is equal to or less than a standard through filtering.

The predicted track generation unit 220 may process a detection point input from each sensor to detect an object and predict track information on the basis of the detected object. A track may be generated in the form of a box fitting the outline of an object and may include information such as a position, a speed, and a class.

One track may be output per sensor for one object. However, even when the same object is sensed, attributes of a generated track, such as the size, position, and speed, may be different according to the characteristics of each sensor.

The association unit 300 determines similarity between tracks generated by sensors and fuses the tracks into one fusion track. The association unit 300 may generate a sensor fusion track in consideration of a distance and an overlapping area between the center points of a reference track and a target track. The configuration of the association unit 300 will be described in detail later with reference to FIG. 3.

The fusion track output unit 230 outputs and manages a sensor fusion track generated by the association unit 300.

Figure 3:
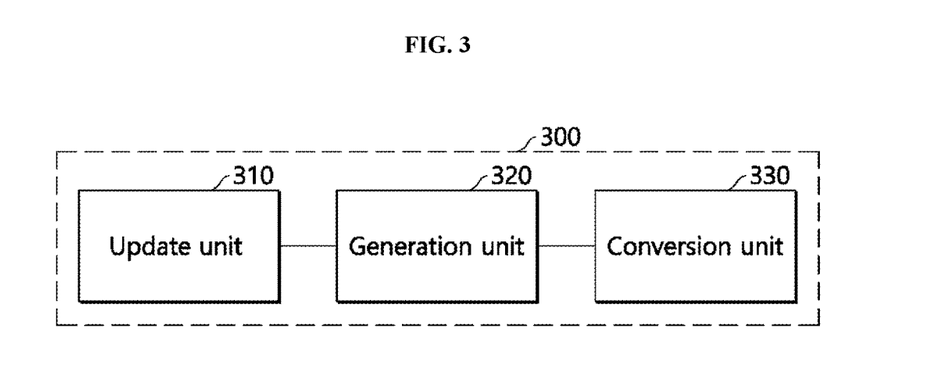
FIG. 3 is a schematic block diagram of an association unit of FIG. 2.

FIG. 3 is a schematic block diagram of the association unit 300 of FIG. 2. The association unit 300 may update an association target sensor fusion track among gated sensor tracks, and calculate a combined cost by reflecting characteristics of an overlapping area of a reference track and an associated track, which are shape features of the two tracks, along with a distance between the two tracks, to generate a sensor fusion track that is most similar to a real object.

Referring to FIG. 3, the association unit 300 may include an update unit 310, a generation unit 320, and a conversion unit 330.

The update unit 310 determines similarity between reference track information and predicted track information generated by each sensor and updates an association target sensor fusion track. To determine similarity, a gate may be set on the basis of a reference track and it may be determined whether a reference point of a predicted track is located within the gate. The reference track may be a track generated by any one of a plurality of sensors, and a method of selecting a sensor of the reference track may be preset. It is also possible to set a fusion track generated at a previous time as a reference track. The gate is an area set on the basis of the reference track, and sensor tracks for which a degree of association will be calculated may be selected depending on whether a reference point of a predicted track is located within the gate. When the reference point of the predicted track is located within the gate, the predicted track of the corresponding sensor is updated to a target for which association with the reference track will be calculated. When the reference point of the predicted track is located outside the gate, the predicted track may be removed upon determining that the predicted track of the corresponding sensor is not associated with the reference track.

The generation unit 320 mathematically calculates degrees of association between gated predicted tracks and the reference track, selects a track most likely to be the same object as the reference track as an associated track, and generates an association map (AssoMap) of a finally selected sensor. The generation unit 320 may calculate a combined cost using a distance between the reference track and a predicted track and an overlapping area of the two tracks. A cost is a mathematical value obtained by calculating a degree of similarity between two tracks, and is typically a value obtained by calculating a distance between tracks using the Euclidean distance or the Mahalanobis distance. The shorter the distance between tracks, the higher the probability that the two tracks are the same object, and thus a track with a lower cost may be selected as an associated track. The present embodiment proposes a technique for calculating a combined cost by reflecting a distance between two tracks and characteristics of an overlapping area of the two tracks, which are shape characteristics of the two tracks. A formula for calculating a combined cost may be preset, and the generation unit 320 may select a sensor which will generate a fusion track from among a plurality of predicted tracks according to a combined cost calculation result and generate an association map. A specific method of calculating a combined cost will be described in detail with reference to FIGS. 6 to 11.

The conversion unit 330 generates a fusion track according to track information of a selected associated sensor and updates physical information of the fusion track.

As described above, in order to select a sensor track most likely to be the same object as the reference track, the sensor information fusion device 200 of the embodiment may calculate a combined cost by reflecting an overlapping area between the two tracks along with the distance therebetween, to improve the accuracy of a fusion track.

The embodiment may improve the performance of fusion between different types of sensors, and in particular, improve the performance of fusion between sensors having similar attributes of raw data of sensor information.

Figure 4:
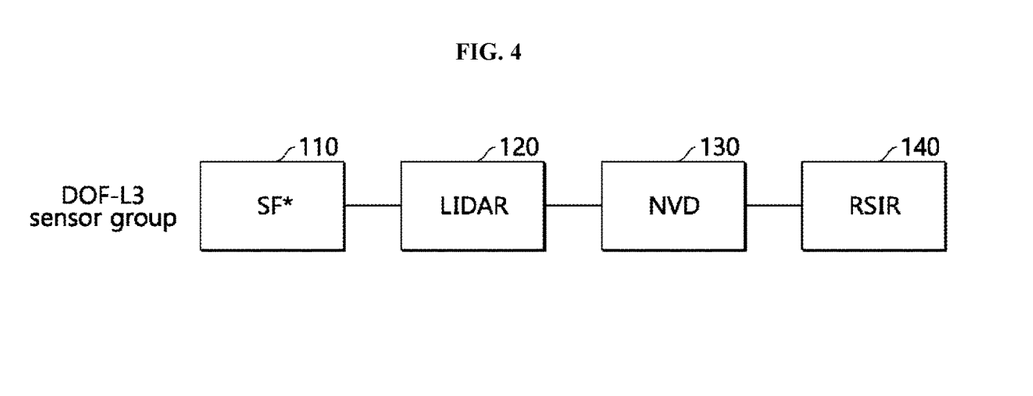
FIG. 4 is a block diagram illustrating a configuration of a sensor device to which the sensor information fusion device according to an exemplary embodiment is applied.

FIG. 4 is a block diagram illustrating a configuration of a sensor device to which the sensor information fusion device according to the embodiment is applied.

The sensor information fusion device 200 of the embodiment may include a light detection and ranging (lidar) unit 120, a near vehicle detection (NVD) unit 130, and a rear side view camera (RSIR) 140, obtain sensor fusion star (SF*) data 110 and fuse sensor data. The lidar unit 120, the NVD unit 130, and the RSIR 140 may obtain detection points and output the same to the sensor information fusion device 200. In this manner, by applying fusion of data of different types of sensors having raw data with similar characteristics, data conversion can be simplified and sensor fusion performance can be improved.

The sensor information fusion device 200 may compare tracks obtained from the lidar unit 120, the NVD unit 130, and the RSIR 140 with a reference track, select a sensor track most likely to be the same object as the reference track as an associated sensor track, and output a fusion sensor track. The reference track may be a fusion track generated at a previous time or a track generated by any one of a plurality of sensors. The reference track may be selected in the order of the sensor fusion star (SF*) 110, the lidar unit 120, the NVD unit 130, and the RSIR 140.

Figure 5:
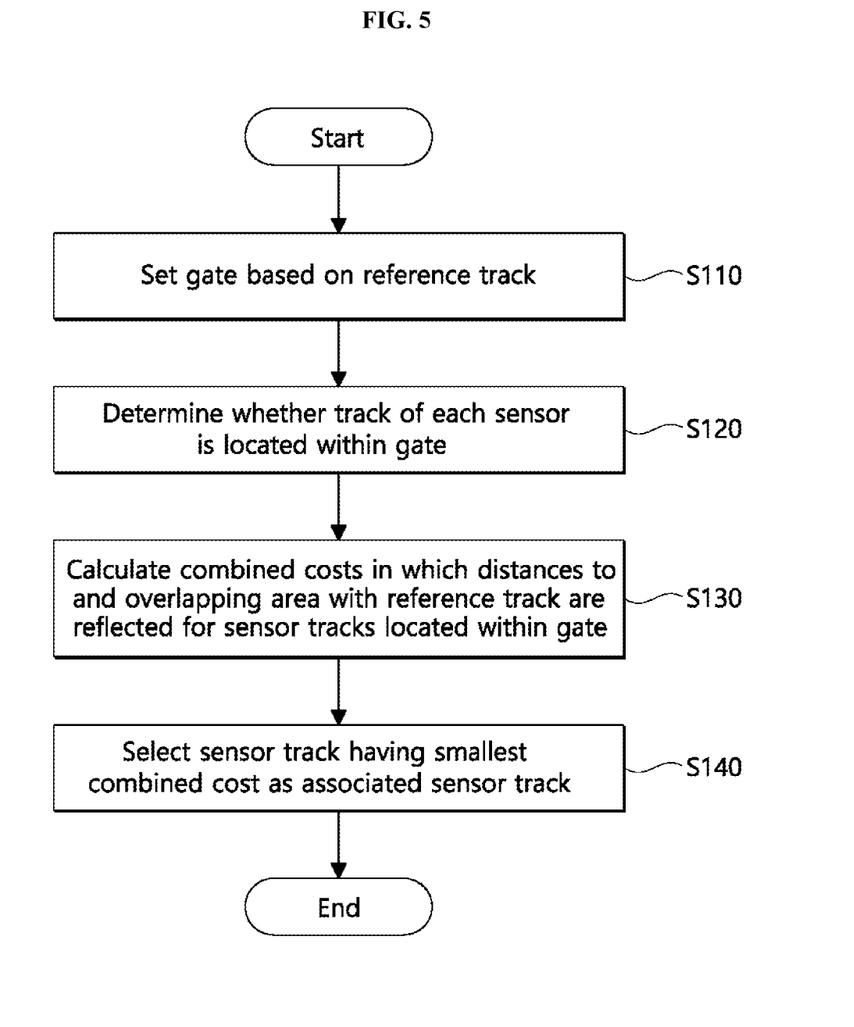
FIG. 5 is a flowchart of a sensor information fusion method according to an exemplary embodiment.

FIG. 5 is a flowchart of a sensor information fusion method according to an embodiment.

Referring to FIG. 5, in order to select an association target sensor track, first, a gate is set on the basis of a reference track (S110). The reference track may be a fusion track generated at a previous time or a track generated by any one of a plurality of sensors. The reference track may be selected in the order of a fusion sensor track, lidar, NVD, and RSIR. The gate may be a predetermined area set around a predetermined reference point on the reference track.

It is determined whether a track of each sensor is located within the gate (S120). If the sensor track is located within the gate or a predetermined reference point on the sensor track is located within the gate, the sensor track may be determined to be a track associated with the reference track. If the sensor track is located outside the gate, it is determined that the sensor track is not associated with the reference track and can be removed.

A degree of association with the reference track is mathematically calculated for the sensor track located within the gate (S130). In an embodiment, a combined cost may be calculated using a distance between the reference track and a predicted track and an overlapping area of the two tracks.

Since the two tracks are more likely to be the same object as the combined cost is smaller, a sensor of a track having the smallest combined cost may be selected as an associated sensor (S140).

Here, a combined cost is a value calculated using overlap characteristics using a distance between the reference track and a sensor track and shape information on the tracks and may be calculated using the following formula.

$$\text{Combined Cost} = W_{NN} * \frac{D_{NN}}{D_{max}} + W_{OL} * \left(1 - \frac{A_{OL}}{A_T}\right) \quad \text{[Formula 1]}$$

$$W_{NN} + W_{OL} = 1$$

If $A_R > A_T$, $$W_{NN} = 1 - 0.5 * \frac{A_T}{A_R},$$

$$W_{OL} = 1 - W_{NN}$$

Else, $W_{OL} = 1 - 0.5 * \frac{A_R}{A_T},$ $$W_{NN} = 1 - W_{OL}$$

$W_{NN}$, $W_{OL}$: Weight values adjusted depending on the ratio of the areas between a reference track and a target track $D_{NN}$: Distance between midpoints of the reference track and the target track $D_{max}$: Distance between the midpoint of the reference track and one of two intersection points of the reference track located on a straight line connecting the midpoints of the reference track and the target track, which is closer to the midpoint of the target track $A_{OL}$: Overlapping area between the reference track and the target track $A_T$: Area of the target track $A_R$: Area of the reference track In Formula 1, the weights $W_{NN}$ and $W_{OL}$ are dynamically set to values between 0 and 1 depending on the area ratio of the reference track and the target track.

$$\frac{D_{NN}}{D_{max}}$$

is a value obtained by normalizing the cost (normalized NN cost) of the distance between the midpoints of the reference track and the target track and has a range of $$0 < \frac{D_{NN}}{D_{max}} < 1.$$

As $D_{NN}$ (distance between the midpoints of the reference track and the target track) becomes smaller, the reference track and the target track are more likely to be the same object, and thus it is appropriate to apply the value $$\frac{D_{NN}}{D_{max}}$$

at the time of calculating a combined cost.

$$1 - \frac{A_{OL}}{A_T}$$

is a value obtained by normalizing the cost of an overlapping area between tracks (normalized OL cost) and has a range of $$0 < 1 - \frac{A_{OL}}{A_T} < 1.$$

As $A_{OL}$ (overlapping area between the reference track and the target track) increases, the reference track and the target track are more likely to be the same object, and thus it is appropriate to apply the value $$1 - \frac{A_{OL}}{A_T}$$

at the time of calculating a combined cost.

$W_{NN}$ and $W_{OL}$ are weights assigned to the cost of the distance between the midpoints of the tracks and the cost of the overlapping area between the tracks and may be dynamically set to values between 0 and 1 depending on the area ratio of the reference track and the target track. That is, when $W_{NN}$ is larger, the same object can be determined by assigning a higher weight to the cost of the distance between the midpoints of the tracks, and when $W_{OL}$ is larger, the same object can be determined by assigning a higher weight to the cost of the overlapping area between the tracks.

The combined cost calculation formula will be described in detail with reference to FIGS. 6 to 11.

Figure 6:
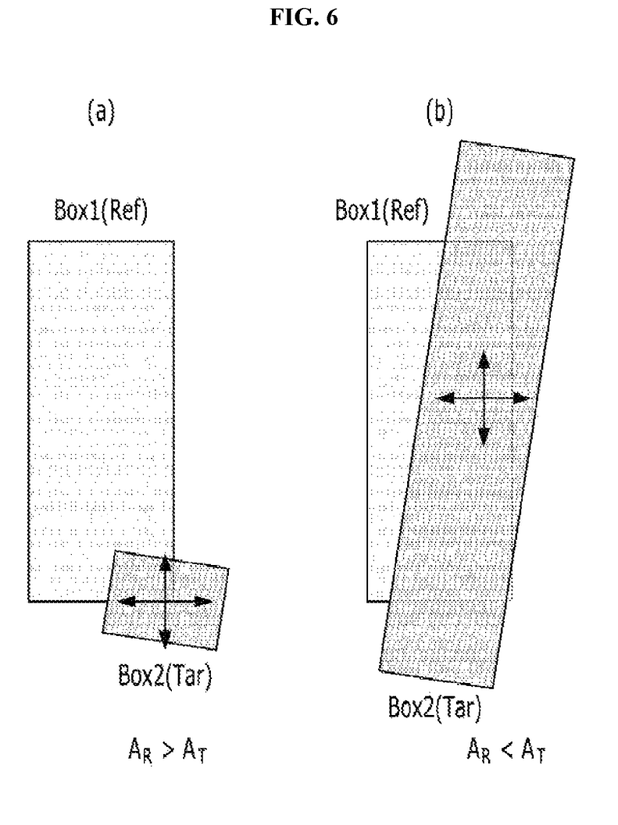
FIG. 6 is a diagram describing the principle of setting the weights $W_{NN}$ and $W_{OL}$ in a combined cost calculation formula according to an exemplary embodiment.

FIG. 6 is a diagram for describing the principle of setting the weights $W_{NN}$ and $W_{OL}$ in the combined cost calculation formula. $W_{NN}$ is a weight value (normalized NN cost weight) set to the cost of the distance between the midpoints of tracks, and $W_{OL}$ is a weight value (normalized cL Cost weight) set to the cost of an overlapping area between the tracks. By setting the two weight values such that the sum of $W_{NN}$ and $W_{OL}$ becomes 1, reflection rates of the cost of the midpoint distance and the cost of the overlapping area can be adjusted. $W_{NN}$ and $W_{OL}$ may be adjusted depending on a ratio of the area $A_R$ of a box Box1 of the reference track Ref to the area $A_T$ of a box Box2 of the target track Tar.

FIG. 6 illustrates a case (a) where the area $A_T$ of the target track is less than the area $A_R$ of the reference track ($A_R$>$A_T$), and (b) where the area $A_T$ of the target track is larger than the area $A_R$ of the reference track ($A_R$<$A_T$).

Referring to (a) of FIG. 6, when the area $A_T$ of the target track is less than the area $A_R$ of the reference track ($A_R$>$A_T$), if the area $A_T$ of the target track is much smaller, even a small change in vertical/horizontal positions of the target track box Box2(Tar) can significantly change the cost of the overlapping area. Therefore, when it is determined whether the two tracks are the same object by applying the cost of the overlapping area, there is a high possibility of error.

Accordingly, if the area $A_T$ of the target track is smaller than the area $A_R$ of the reference track ($A_R$>$A_T$), it is possible to further increase the reflection rate of the cost of the midpoint distance between tracks and reduce the reflection rate of the cost of the overlapping area between the tracks by setting $W_{NN}$ to a larger value.

Referring to (b) of FIG. 6, when the area $A_T$ of the target track is larger than the area $A_R$ of the reference track ($A_R$<$A_T$), even if the vertical/horizontal positions of the target track box Box2(Tar) change, the cost of the overlapping area does not considerably change, but the cost of the midpoint distance between the tracks may relatively considerably change. Therefore, when it is determined whether the two tracks are the same object by applying the cost of the overlapping area, there is a high possibility of error. Accordingly, if the area $A_T$ of the target track is larger than the area $A_R$ of the reference track ($A_R$<$A_T$), it is possible to increase the reflection rate of the cost of the overlapping area and to reduce the reflection rate of the cost of the midpoint distance between the tracks by setting $W_{OL}$ to a larger value.

Figure 7:
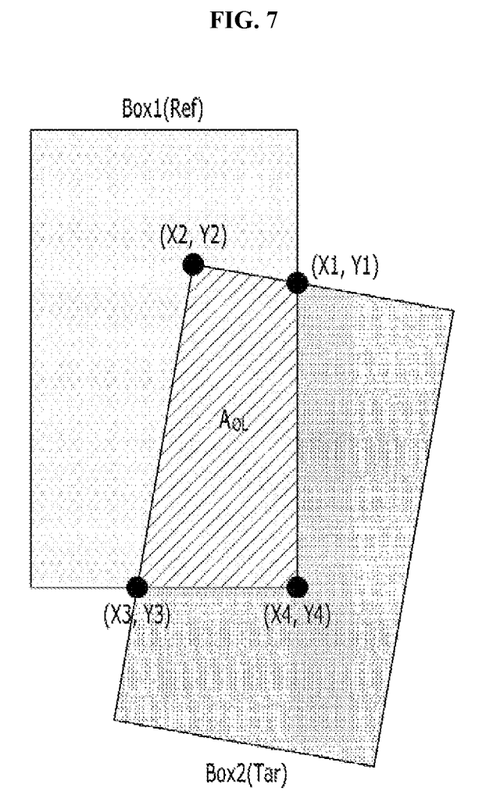
FIG. 7 is a diagram describing a combined cost calculation formula according to an exemplary embodiment where it is assumed that $A_T$ is the area of the target track and $A_R$ is the area of the reference track.

Referring to FIG. 7, $A_{OL}$ refers to the overlapping area between the reference track and the target track. Assuming that $A_T$ is the area of the target track and $A_R$ is the area of the reference track, the maximum value of $A_{OL}$ is $A_T$.

When the target track completely overlaps, $A_{OL}$ completely overlaps $A_T$ and the value of $A_{OL}/A_T$ becomes 1, and thus the value $$1 - \frac{A_{OL}}{A_T}$$

is calculated as 0. On the other hand, when the target track does not overlap, $A_{OL}$ is 0, and thus the value of $A_{OL}/A_T$ becomes 0. Accordingly, the value $$1 - \frac{A_{OL}}{A_T}$$

is calculated as 1. That is, the larger the overlapping area of the target track is, the smaller the value $$1 - \frac{A_{OL}}{A_T}$$

becomes, and thus the finally calculated combined cost value also becomes smaller. Accordingly, the fact that the reference track and the target track are more likely to be the same object as the overlapping area of the target track increases can be reflected in the combined cost calculation formula.

Figure 8:
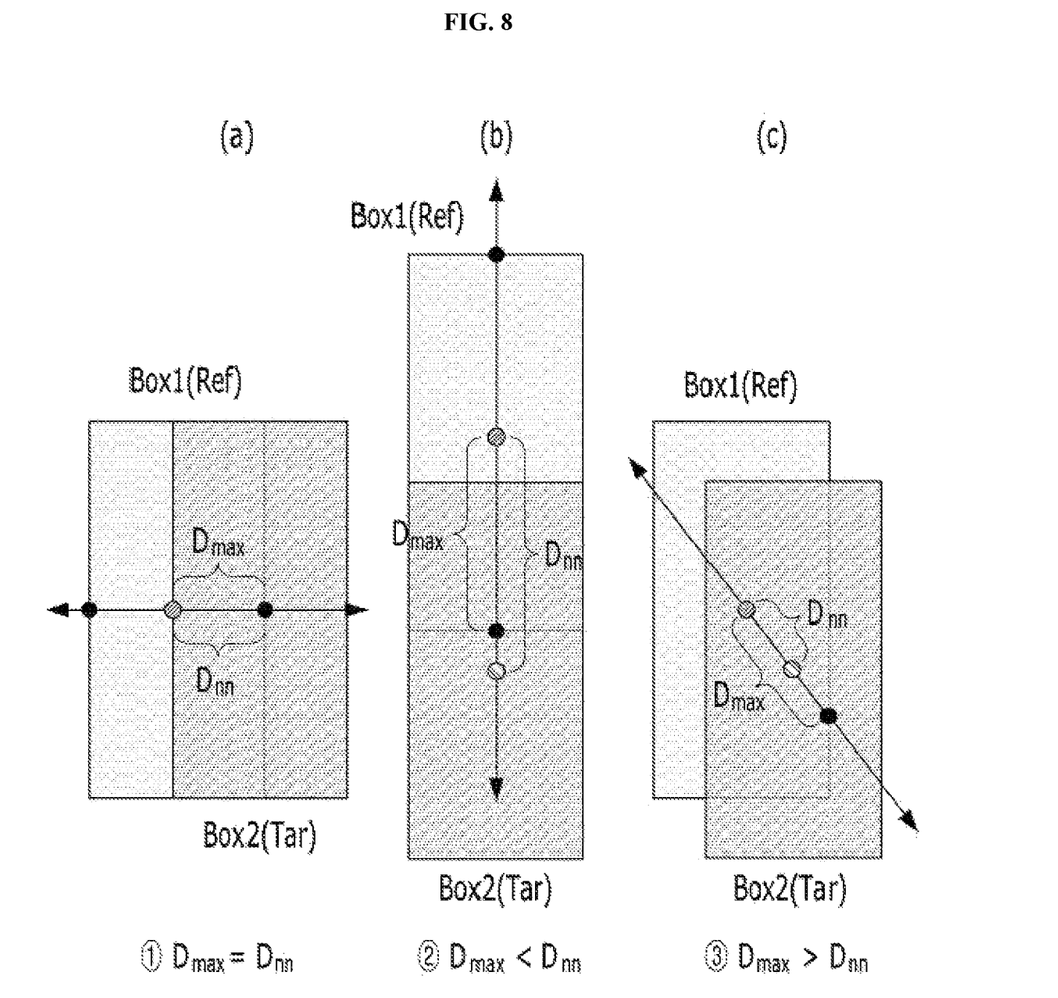
FIG. 8 is a diagram describing relationship between the magnitudes of $D_{max}$ and $D_{NN}$ according to the relative positions of the reference track and a target track in the combined cost calculation formula according to an exemplary embodiment.

FIG. 8 is a diagram for describing characteristics of the value $$\frac{D_{NN}}{D_{max}}$$

in the combined cost calculation formula.

$$\frac{D_{NN}}{D_{max}}$$

is a value (normalized NN cost) obtained by normalizing the cost of the midpoint distance between the reference track and the target track and has a range of $$0 < \frac{D_{NN}}{D_{max}} < 1.$$

$D_{NN}$ represents the midpoint distance between the reference track and the target track.

$D_{max}$ represents the distance between the midpoint of the reference track and one of two intersection points of the reference track located on a straight line connecting the midpoints of the reference track and the target track, which is closer to the midpoint of the target track. $D_{max}$ may be determined depending on the relative positions of the reference track and the target track.

FIG. 8 illustrates a relationship between the magnitudes of $D_{max}$ and $D_{NN}$ according to the relative positions of the reference track and a target track. FIG. 8 illustrates a case in which boxes of the reference track and the target track have a shape having a long vertical length and a short horizontal length, which is generally generated when a vehicle is sensed.

FIG. 8(a) illustrates a case in which a lateral error occurs, (b) illustrates a case in which a longitudinal error occurs, and (c) illustrates a case in which longitudinal/lateral errors occur.

When a lateral error occurs as in (a), $D_{max}=D_{NN}$, and thus $$\frac{D_{NN}}{D_{max}}$$

can increase or decrease from 1 as $D_{NN}$ increases or decreases.

When a longitudinal error occurs as shown in (b), since $D_{max} < D_{NN}$, $$\frac{D_{NN}}{D_{max}}$$

has a value greater than 1, and thus a finally calculated combined cost value increases.

When longitudinal/horizontal errors occur as shown in (c), $D_{max} > D_{NN}$, and thus $$\frac{D_{NN}}{D_{max}}$$

has a value smaller than 1.

As described above, when an error occurs in the longitudinal direction, the lateral direction, and the longitudinal/lateral directions, a larger cost can be calculated for a lateral error than a cost for a longitudinal error using $$\frac{D_{NN}}{D_{max}}.$$

Accordingly, when $$\frac{D_{NN}}{D_{max}}$$

is applied, not only is the distance between midpoints ($D_{NN}$) compared, but the actual distance $$\frac{D_{NN}}{(D_{max})}$$

between two points can be calculated using multivariate values ($D_{max}$) that are correlated, and thus it is possible to obtain the same effect as if the Mahalanobis distance were applied.

Figure 9:
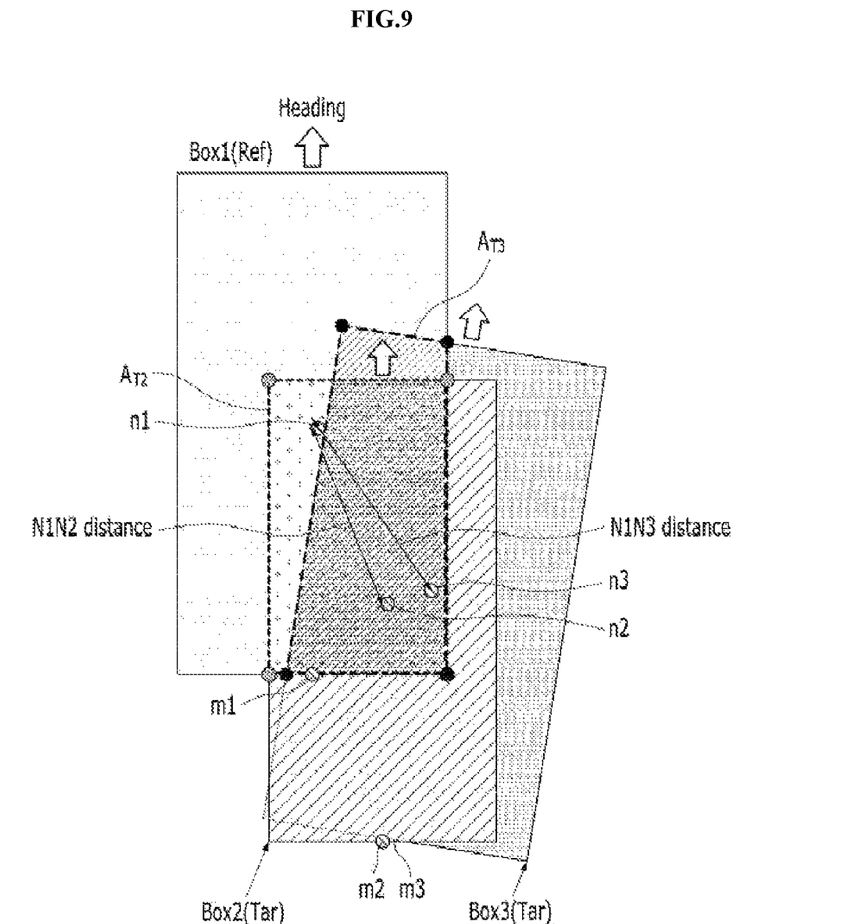
FIG. 9 is a diagram describing a method of selecting an associated track by applying the combined cost calculation formula when there are two target tracks Box2 and Box3 having the same midpoint distance to a reference track (Ref) Box1.
Figure 10:
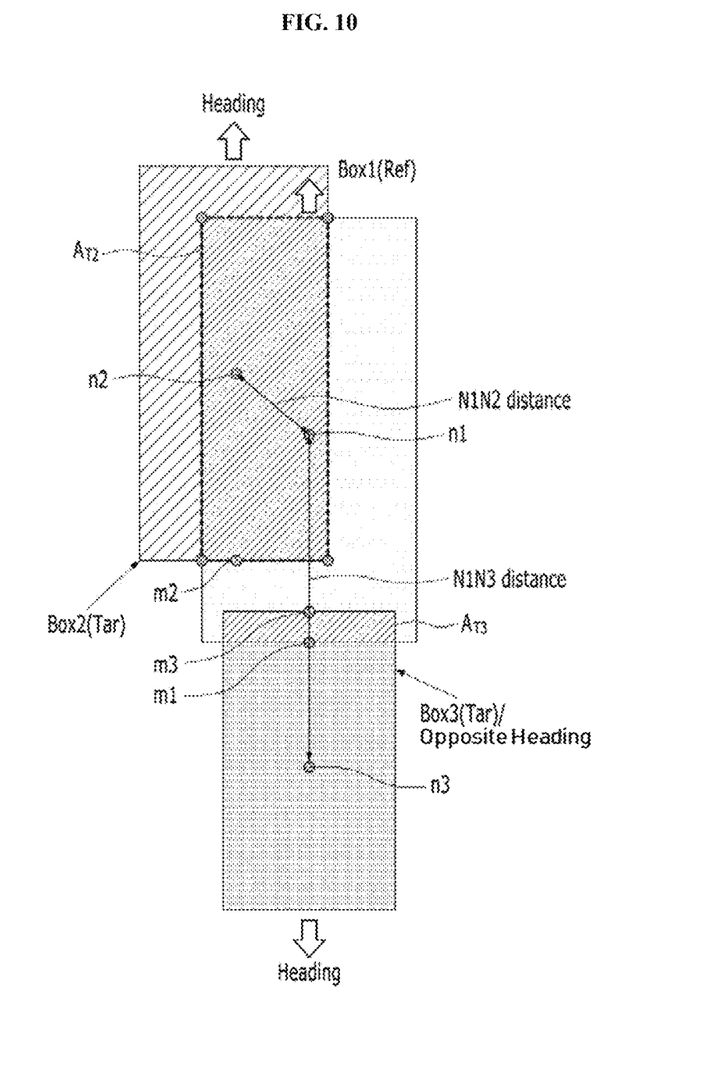
FIG. 10 is a diagram describing a method of selecting an associated track by applying the combined cost calculation formula in which a reference track (Ref) Box1 and target tracks Box2 and Box3 are present and Box3 is an object having an opposite heading direction.

FIGS. 9 and 10 are diagrams for describing a method of selecting an associated track by applying the combined cost calculation formula.

FIG. 9 is a diagram for describing a method of selecting one associated box when there are two target tracks Box2 and Box3 having the same midpoint distance to a reference track (Ref) Box1.

When rear bumper distances of the boxes are compared according to the conventional cost calculation method, the midpoint m1 of the rear bumper of Box1, the midpoint m2 of the rear bumper of Box2, and the midpoint m3 of the rear bumper of Box3 are calculated as the same cost.

On the other hand, the combined cost calculated according to the embodiment represents higher association when the ratio of the overlapping areas $A_{T2}$ and $A_{T3}$ as well as the midpoint distances (N1N2 distance, N1N3 distance) between the tracks are large. Accordingly, although the midpoint distance (N1N2 distance) between Box1 and Box2 and the midpoint distance (N1N3 distance) between Box1 and Box3 are identical in FIG. 9, Box2 can be selected as an associated track because the ratio of the overlapping area $A_{T2}$ of Box2 is higher than the ratio of the overlapping area $A_{T3}$ of Box3.

FIG. 10 illustrates a case in which a reference track (Ref) Box1 and target tracks Box2 and Box3 are present and Box3 is an object having an opposite heading direction.

When only distances between the midpoints of the rear bumpers are compared according to the conventional cost calculation method, Box3 may be selected as an associated box because a distance between the midpoint m1 of the rear bumper of Box1 and the midpoint m3 of the rear bumper of Box3 is shorter than a distance between the midpoint m1 of the rear bumper of Box1 and the midpoint m2 of the rear bumper of Box2. However, since Box3 has heading opposite that of Box1 that is a reference track, an error of recognizing an object completely different from Box1 as the same object occurs.

On the other hand, according to the combined cost of the embodiment, association is determined in consideration of the midpoint distances (N1N2 distance and N1N3 distance) and the ratios of overlapping areas $A_{T2}$ and $A_{T3}$ between the tracks together. Since the midpoint distance (N1N2 distance) between Box2 and Box1 is shorter than the midpoint distance (N1N3 distance) between Box1 and Box3, and the ratio of the overlapping area $A_{T2}$ of Box2 is higher than the ratio of the overlapping area $A_{T3}$ of Box3, Box2 may be selected as an associated track.

As described above, according to the embodiment, it is possible to improve the accuracy of sensor fusion by calculating a combined cost using overlap characteristics using a distance between a reference track and a sensor track and shape information on the reference track and the sensor track. In particular, when two or more of the same sensor candidate groups are generated, a cost may be calculated by reflecting an overlapping area in merging, U-turn, and oncoming situations where it is difficult to check association only with a distance-based cost, thereby improving the accuracy of selection of an associated sensor.

Although the present disclosure has been described focusing on certain exemplary embodiments, such embodiments are merely examples and do not limit the present invention, and those of ordinary skill in the art can understand that various modifications and applications are possible without departing from the essential characteristics of the embodiments. For example, each component specifically described in the embodiments can be modified. Differences related to such modifications and applications should be construed as being included in the scope of the present invention defined in the appended claims.

What is claimed is:

1. A method performed by a vehicle, the method comprising:
    obtaining, by a plurality of sensors mounted on the vehicle, sensor data regarding one or more objects around the vehicle;

detecting, by a controller of the vehicle, the one or more objects by processing the sensor data obtained by the plurality of sensors;

determining, by the controller, tracks respectively associated with the plurality of sensors for each of the one or more objects, wherein each of the tracks includes information of at least one of distance, position, speed, or class;

selecting, by the controller, one or more target tracks, each having a distance within a predetermined distance from a reference track from among the tracks; and selecting, by the controller, a fusion track from among the selected one or more target tracks to be fused with the reference track on the basis of sums of first calculation values calculated according to distances between the selected one or more target tracks and the reference track, and second calculation values calculated according to overlapping areas of the selected one or more target tracks and the reference track; and controlling, by the controller, to drive the vehicle based on a fused track that is generated by fusing the fusion track and the reference track.

2. The method according to claim 1, wherein the selecting of one or more target tracks comprises:

setting a gate on the basis of the reference track; and selecting, as the one or more target tracks, tracks located inside the gate among the tracks obtained by the plurality of sensors.

3. The method according to claim 1, wherein the first calculation values are calculated according to a distance between a midpoint of the reference track and midpoints of each of the selected one or more target tracks.

4. The method according to claim 1, wherein the selecting of a fusion track to be fused with the reference track comprises:

calculating the first calculation values as smaller values as the distances between a midpoint of the reference track and the midpoints of the one or more target tracks become shorter; and selecting a target track having the smallest sum of the first calculation value and the second calculation value as the fusion track to be fused with the reference track.

5. The method according to claim 4, further comprising calculating the first calculation value as a relatively large value when the size of a target track is smaller than the size of the reference track.

6. The method according to claim 4, further comprising calculating the first calculation value as a relatively large value when the reference track and a target track are arranged in a lateral direction.

7. The method according to claim 1, wherein the selecting of a fusion track to be fused with the reference track comprises:

calculating the second calculation values as smaller values as the overlap ratios of the one or more target tracks and the reference track increase; and selecting a target track having the smallest sum of the first calculation value and the second calculation value as the fusion track to be fused with the reference track.

8. The method according to claim 7, further comprising calculating the second calculation value as a relatively small value when the size of a target track is greater than the size of the reference track.

9. The method according to claim 1, wherein the sums of the first calculation values and the second calculation values are calculated using the following combined cost calculation formula, $$\text{Combined Cost} = W_{NN} * \frac{D_{NN}}{D_{max}} + W_{OL} * \left(1 - \frac{A_{OL}}{A_T}\right)$$

wherein $W_{NN}$ and $W_{OL}$ are weight values adjusted depending on a ratio of the areas between the reference track and a target track, $D_{NN}$ is a distance between midpoints of the reference track and the target track, $D_{max}$ is a distance between the midpoint of the reference track and one of two intersection points of the reference track located on a straight line connecting the midpoints of the reference track and the target track, which is closer to the midpoint of the target track, $A_{OL}$ is an overlapping area between the reference track and the target track, and $A_T$ is an area of the target track.

10. The method according to claim 9, wherein the sum of $W_{NN}$ and $W_{OL}$ is 1, the weight of $W_{OL}$ increases when the size of the target track is greater than the size of the reference track, and the weight of $W_{NN}$ increases when the size of the target track is smaller than the size of the reference track.

11. The method according to claim 9, further comprising calculating $W_{NN}$ and $W_{OL}$ using the following formulas when the area $A_R$ of the reference track is greater than the area $A_T$ of the target track ($A_R > A_T$)

$$W_{NN} = 1 - 0.5 * \frac{A_T}{A_R}, \ W_{OL} = 1 - W_{NN}.$$

12. The method according to claim 11, further comprising calculating $W_{NN}$ and $W_{OL}$ using the following formulas when the area $A_R$ of the reference track is not greater than the area $A_T$ of the target track $$W_{OL} = 1 - 0.5 * \frac{A_R}{A_T}, \ W_{NN} = 1 - W_{OL}.$$

13. A non-transitory computer-readable recording medium recording program instructions executed by a controller of a vehicle, the computer-readable recording medium comprising:

program instructions that obtain sensor data from a plurality of sensors mounted on the vehicle regarding one or more objects around the vehicle;

program instructions that detect the one or more objects by processing the sensor data obtained by the plurality of sensors;

program instructions that determine tracks respectively associated with the plurality of sensors for each of the one or more objects, wherein each of the tracks includes information of at least one of distance, position, speed, or class;

program instructions that select target tracks having distances from a reference track within a predetermined distance from among the tracks;

program instructions that select a fusion track to be fused with the reference track on the basis of sums of first calculation values calculated according to distances between the selected target tracks and the reference track and second calculation values calculated according to overlapping areas of the target tracks and the reference track; and program instructions that control to drive the vehicle based on a fused track that is generated by fusing the fusion track and the reference track.

14. A vehicle comprising:
a plurality of sensors mounted on the vehicle, the plurality of sensors configured to obtain sensor data regarding one or more objects around the vehicle; and
a controller configured to:
  detect the one or more objects by processing the sensor data obtained by the plurality of sensors;
  determine first tracks respectively associated with the plurality of sensors for each of the one or more objects, wherein each of the first tracks includes information of at least one of distance, position, speed, or class;
  select one or more target tracks having distances within a predetermined distance from a reference track from among the first tracks;
  select a target fusion track to be fused with the reference track on the basis of sums of first calculation values calculated according to distances between the selected target tracks and the reference track and second calculation values calculated according to overlapping areas of the selected target tracks and the reference track; and
  control to drive the vehicle based on a fused track that is generated by fusing the fusion track and the reference track.

15. The vehicle according to claim 14, wherein the controller sets a gate on the basis of the reference track and selects, as the one or more target tracks, one or more tracks located inside the gate from among the tracks obtained by the plurality of sensors.

16. The vehicle according to claim 14, wherein the controller calculates the first calculation values as smaller values as the distances between the midpoint of the reference track and the midpoints of the target tracks are shorter and selects a target track having the smallest sum of the first calculation value and the second calculation value as the target fusion track to be fused with the reference track.

17. The vehicle according to claim 14, wherein the controller calculates the second calculation values as smaller values as the overlap ratios of the target tracks and the reference track increase and selects a target track having the smallest sum of the first calculation value and the second calculation value as the target fusion track to be fused with the reference track.

18. The vehicle according to claim 14, wherein the controller calculates the sums of the first calculation values and the second calculation values using the following combined cost calculation formula, $$\text{Combined Cost} = W_{NN} * \frac{D_{NN}}{D_{max}} + W_{OL} * \left(1 - \frac{A_{OL}}{A_T}\right)$$

wherein $W_{NN}$ and $W_{OL}$ are weight values adjusted depending on a ratio of the areas between the reference track and a target track,
$D_{NN}$ is a distance between midpoints of the reference track and the target track,
$D_{max}$ is a distance between the midpoint of the reference track and one of two intersection points of the reference track located on a straight line connecting the midpoints of the reference track and the target track, which is closer to the midpoint of the target track,
$A_{OL}$ is an overlapping area between the reference track and the target track, and
$A_T$ is an area of the target track.

19. The vehicle according to claim 18, the controller calculates $W_{NN}$ and $W_{OL}$ using the following formulas when the area $A_R$ of the reference track is greater than the area $A_T$ of the target track ($A_R > A_T$), and $$W_{NN} = 1 - 0.5 * \frac{A_T}{A_R}, W_{OL} = 1 - W_{NN}$$

calculates $W_{NN}$ and $W_{OL}$ using the following formulas when the area $A_R$ of the reference track is not greater than the area $A_T$ of the target track $$W_{OL} = 1 - 0.5 * \frac{A_R}{A_T}, W_{NN} = 1 - W_{OL}.$$

* * * * *